US010445685B2

(12) United States Patent
Bhatia et al.

(10) Patent No.: US 10,445,685 B2
(45) Date of Patent: *Oct. 15, 2019

(54) DELIVERY CONFIRMATION USING OVERLAPPING GEO-FENCES

(71) Applicant: Amazon Technologies, Inc., Seattle, WA (US)

(72) Inventors: Sandeep Bhatia, Bothell, WA (US); Kevin Lee Davenport, Jr., Seattle, WA (US); Rahul Sharma, Seattle, WA (US); Vinoo Vasudevan, Chennai (IN); Beryl Tomay, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 213 days.

This patent is subject to a terminal disclaimer.

(21) Appl. No.: 15/607,980

(22) Filed: May 30, 2017

(65) Prior Publication Data
US 2017/0372261 A1  Dec. 28, 2017

Related U.S. Application Data

(63) Continuation of application No. 15/192,265, filed on Jun. 24, 2016, now Pat. No. 9,699,606.

(51) Int. Cl.
*G06Q 10/08* (2012.01)
*H04W 4/021* (2018.01)
(Continued)

(52) U.S. Cl.
CPC ....... *G06Q 10/0833* (2013.01); *G06F 3/0481* (2013.01); *G06K 19/06* (2013.01);
(Continued)

(58) Field of Classification Search
CPC ..... H04W 4/021; H04W 4/023; H04W 84/12; G06Q 10/0833
See application file for complete search history.

(56) References Cited

U.S. PATENT DOCUMENTS 6,169,497 B1 * 1/2001 Robert ................... G08G 1/127
340/988
6,664,922 B1 * 12/2003 Fan ....................... G01S 5/0027
342/357.64
(Continued)

FOREIGN PATENT DOCUMENTS

WO 2006065492 A2 6/2006
WO 2006065492 A3 6/2006

OTHER PUBLICATIONS

U.S. Appl. No. 15/192,265, filed Jun. 24, 2016, Notice of Allowance Office Action dated Mar. 22, 2017.
(Continued)

*Primary Examiner* — Sharad Rampuria
(74) *Attorney, Agent, or Firm* — Thomas Horstemeyer, LLP

(57) ABSTRACT

Disclosed are approaches for using overlapping geo-fences to confirm delivery of a shipment. A first client computing device and a second client computing device may be in data communication with a server computing device. The server computing device may receive a delivery notification from the first client computing device. The server computing device may receive a first position of the first client computing device and a second position of the second client computing device. The server computing device may then determine that the second position is within a threshold distance of the first position or vice versa. Finally, the server computing device may generate a delivery confirmation in response to a first determination that the second position is within a threshold distance of the first position and a second determination that the first position is within a threshold distance of the second position.

18 Claims, 10 Drawing Sheets

(51) Int. Cl.
    *H04W 4/02*         (2018.01)
    *G06F 3/0481*      (2013.01)
    *G06K 19/06*       (2006.01)
    *G06Q 30/02*       (2012.01)
    *H04W 84/12*      (2009.01)

(52) U.S. Cl.
    CPC ....... *G06Q 10/083* (2013.01); *G06Q 30/0261* (2013.01); *H04W 4/02* (2013.01); *H04W 4/021* (2013.01); *H04W 4/023* (2013.01); *H04W 84/12* (2013.01)

(56) References Cited

U.S. PATENT DOCUMENTS

| | | | |
|---|---|---|---|
| 7,151,979 B2 * | 12/2006 | Andersen | B65H 18/28 |
| | | | 700/214 |
| 8,280,405 B2 * | 10/2012 | Sanz-Pastor | H04L 51/20 |
| | | | 455/456.2 |
| 2002/0065738 A1 | 5/2002 | Riggs et al. | |
| 2008/0120129 A1 | 5/2008 | Seubert et al. | |
| 2008/0214148 A1 | 9/2008 | Ramer et al. | |
| 2009/0157547 A1 | 6/2009 | Ruckart | |
| 2012/0246077 A1 | 9/2012 | Skaaksrud et al. | |
| 2013/0006773 A1 | 1/2013 | Lutnick et al. | |
| 2014/0045516 A1 | 2/2014 | Turgman et al. | |
| 2014/0141813 A1 | 5/2014 | Johnson | |
| 2015/0081474 A1 | 3/2015 | Kostka et al. | |
| 2015/0081583 A1 | 3/2015 | Butler et al. | |
| 2015/0213497 A1 * | 7/2015 | Jain | G06Q 30/0261 |
| | | | 705/14.58 |
| 2015/0289100 A1 | 10/2015 | Stringer, II | |
| 2017/0011340 A1 | 1/2017 | Gabbai | |
| 2017/0091699 A1 | 3/2017 | Mueller | |

OTHER PUBLICATIONS

U.S. Appl. No. 15/192,330, filed Jun. 24, 2016, Restriction/Election dated Oct. 19, 2018.

International Search Report and Written Opinion dated Jul. 19, 2017 (PCT/US2017/036944).

U.S. Appl. No. 15/192,330, filed Jun. 24, 2016, Non-Final Office Action dated Mar. 21, 2019.

* cited by examiner

US 10,445,685 B2

DELIVERY CONFIRMATION USING OVERLAPPING GEO-FENCES

CROSS-REFERENCE TO RELATED APPLICATIONS

This application is a continuation of, claims priority to, and the benefit of, U.S. patent application Ser. No. 15/192,265, entitled "DELIVERY CONFIRMATION USING OVERLAPPING GEO-FENCES," filed on Jun. 24, 2016, which is incorporated by reference as if set forth herein in its entirety.

BACKGROUND

Packages are regularly shipped and delivered to recipients. In some instances, however, problems arise with delivery of these items. For example, a shipment may be delivered to the wrong address. As another example, a carrier may report an item as delivered even though the customer has not, in fact, received the item.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Items are often shipped and many times these items are delivered to the recipient (e.g., individual, business, organization, etc.) without a problem. However, in a small percentage of instances, items are misdelivered (e.g., delivered to the wrong address), stolen (e.g., unattended packages stolen from a door step), or not delivered at all. In another small percentage of instances, the items are correctly delivered, but recipients fraudulently report items as undelivered or misdelivered. Although tracking software may show that the items were delivered, this tracking software often requires a delivery agent to manually mark a package as delivered (e.g., scan a shipping label on the package, manually key in shipping information, etc.), leaving open the possibility for error on the part of the delivery agent without any further evidence that a package was, in fact, delivered.

Disclosed are various embodiments to determine whether a service was performed by a particular person at a particular time and place. For example, one or more of the embodiments may be employed to determine whether a delivery agent delivered a shipment to a recipient at a specified location (e.g., home, office, etc.). However, the various examples provided herein could also be applied more generally to track whether a service was performed for a customer based on a determination whether the service provider was at the customer's location while the customer was present. For example, determinations could be made that a plumber, electrician, exterminator, or other service provider was present at a customer's home while a customer was also present, indicating that a service was provided to the customer. In the following discussion, a general description of the system and its components is provided, followed by a discussion of the operation of the same.

Figure 1:
FIG. 1 is an illustration of the use of one or more embodiments of the present disclosure.

With reference to FIG. 1, shown is a depiction of a recipient of a delivery receiving a package from a delivery agent. To confirm receipt, the recipient and the delivery agent use their respective mobile computing devices 100*a* and 100*b* to send a delivery notification to a remote computing device. In some instances, the delivery notification sent from each mobile computing device 100*a* and 100*b* can include the location of the respective mobile computing device 100*a* and 100*b*. In other instances, the remote computing device can query each mobile computing device 100*a* and 100*b* for its location.

The remote computing device may then determine whether the two mobile computing devices 100*a* and 100*b* are within a geo-fenced area corresponding to a delivery location for the shipment. The geo-fenced area can be formed or defined by a virtual perimeter surrounding the area corresponding to the delivery location for the shipment. The virtual perimeter can correspond to a two-dimensional or a three-dimensional perimeter. A two-dimensional perimeter can include an area centered around the delivery location, while a three-dimensional perimeter may include a height or altitude of the delivery location. For example, a three-dimensional perimeter may use height or altitude in order to center the geo-fence on a particular floor or suite of a building. The remote computing device may also determine whether the two mobile computing devices 100 are in proximity to each other. If both mobile computing devices 100 are within the geo-fenced area, the remote computing device may determine that the delivery agent is making a delivery to the correct delivery address or other delivery location (e.g., correct apartment building, office building, etc.). If both mobile computing devices 100a and 100b are also in proximity to each other, then the remote computing device may determine that the delivery agent has delivered the package to the correct person or address (e.g., correct apartment in apartment building, correct office suite in office building, etc.).

Figure 2:
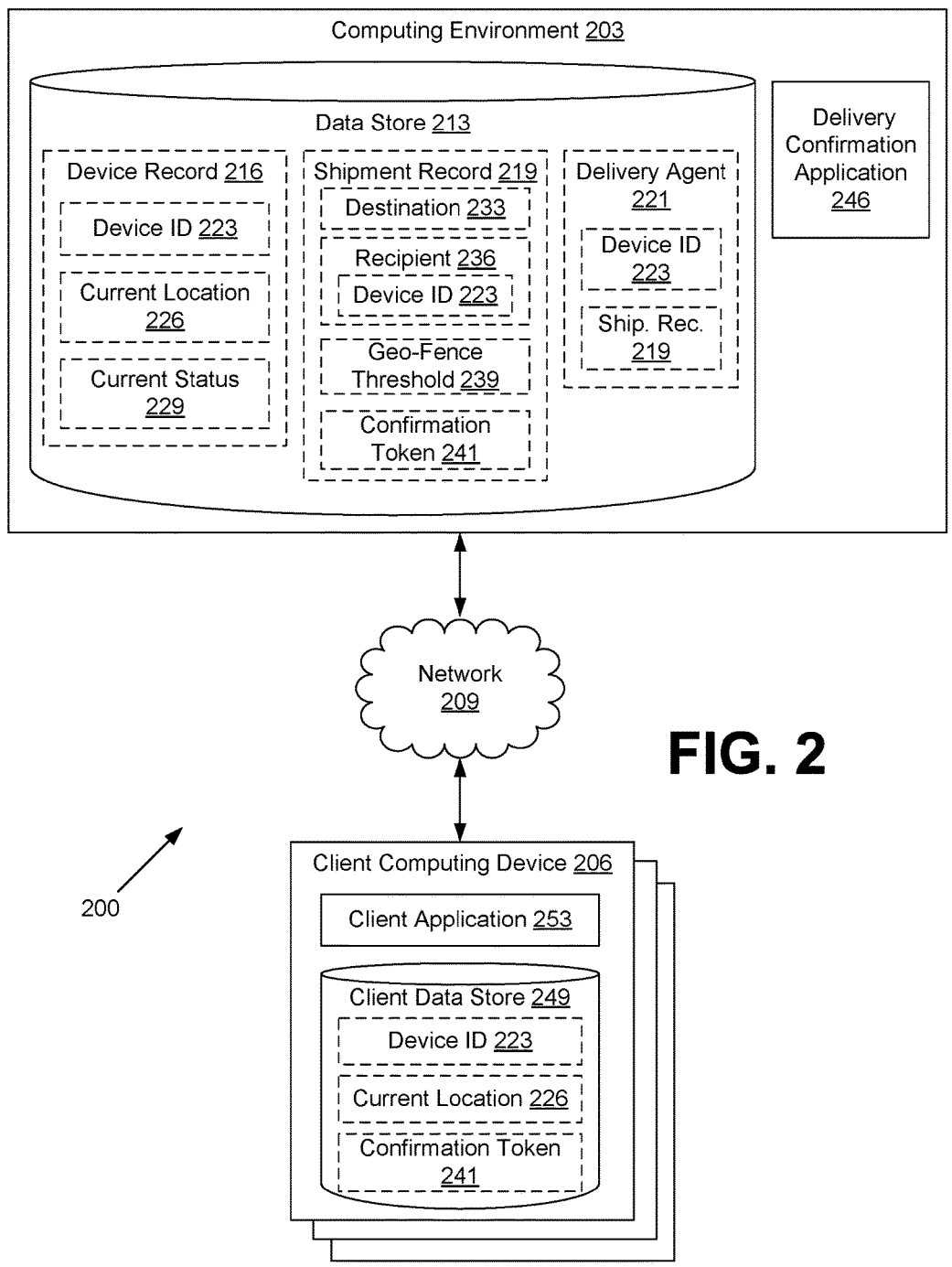
FIG. 2 is a drawing of a networked environment according to various embodiments of the present disclosure.

With reference to FIG. 2, shown is a networked environment 200 according to various embodiments. The networked environment 200 includes a computing environment 203 and a client computing device 206, which are in data communication with each other via a network 209. The network 209 includes, for example, the Internet, intranets, extranets, wide area networks (WANs), local area networks (LANs), wired networks, wireless networks, or other suitable networks, as well as any combination of two or more such networks. Such networks may include satellite networks, cable networks, Ethernet networks, or other types of networks.

The computing environment 203 may include, for example, a server computer or any other system providing computing capability. Alternatively, the computing environment 203 may employ a plurality of computing devices that may be arranged in one or more server banks, computer banks, or other arrangements. Such computing devices may be located in a single installation or may be distributed among many different geographical locations. For example, the computing environment 203 may include a plurality of computing devices that together may include a hosted computing resource, a grid computing resource, or any other distributed computing arrangement. In some cases, the computing environment 203 may correspond to an elastic computing resource where the allotted capacity of processing, network, storage, or other computing-related resources may vary over time. Various applications or other functionality may be executed in the computing environment 203 according to various embodiments.

Various data is stored in a data store 213 that is accessible to the computing environment 203. The data store 213 may be representative of a plurality of data stores 213 as can be appreciated. The data stored in the data store 213, for example, is associated with the operation of the various applications or functional entities described below. The data stored in the data store 213 includes, for example, device records 216, shipment records 219, delivery agent 221 records and potentially other data.

A device record 216 represents information related to a client computing device 206 associated with a shipment. The device record 216 could include information related to a client computing device 206 of the recipient or a client computing device 206 located at the destination. Likewise, the device record 216 can include information related to a client computing device 206 carried or worn by a delivery agent 221. Accordingly, the device record 216 can include a device identifier 223, a current location 226 of the client computing device 206, and a current status 229 of the client computing device 206.

The device identifier 223 can correspond to a unique identifier for the client computing device 206, which allows a single device record 216 to map to a single client computing device 206. In these instances, the device identifier 223 can include, for example, a serial number, media access control (MAC) address for a network interface of the client computing device 206, a device fingerprint, or other information that uniquely identifies a client computing device 206. In some instances, the device identifier 223 can also represent a unique user identifier, such as a username, which a remote computing device can use to uniquely identify a client computing device 206 based on the user of the client computing device 206.

The current location 226 of the client computing device 206 represents a geographical location of the client computing device 206. The current location 226 could correspond, for example, to geographical coordinates (e.g., latitude and longitude), an address (e.g., 123 Main Street, Some City, Some State, USA), or other representation. The current location 226 can be determined through a number of approaches.

In some instances, the current location 226 can be determined using geo-location circuitry embedded in the client computing device 206. Such geo-location circuitry can include a global satellite navigation receiver, such as a Global Positioning System (GPS) receiver, a Global Navigation Satellite System (GLONASS) receiver, a BeiDou Navigation Satellite System (BDS) receiver, an Indian Regional Navigation Satellite System (IRNSS) receiver, or similar satellite navigation receiver.

In other instances, the geo-location circuitry can include components of a baseband processor included in the client computing device 206, a subscriber identity module (SIM) card included in the client computing device 206, or other network interface card included in the client computing device 206. In these instances, the baseband processor or SIM card can measure the signal strength of the connection between the client computing device 206 and a network 209 access point (e.g., cellular tower, Wi-Fi access point, etc.), the round trip time of communications between the client computing device 206 and the network 209 access point to determine the location of the client computing device 206 using various multilateration approaches.

The current status 229 of the client computing device 206 represents the status of the client computing device 206. For example, the current status 229 could include a representation of whether the client computing device 206 is connected to the network 209 (e.g., has cellular or Wi-Fi network access), whether the client computing device 206 is powered on, powered off, or in a low power mode (e.g., sleep mode or hibernation mode). The value of the current status 229 can operate as a conditional trigger for various interactions of the computing environment 203 with the client computing device 206.

A shipment record 219 represents information related to a shipment of items or goods. Accordingly, the shipment record 219 can include information such as the destination 233 of the shipment, the recipient 236 of the shipment, a geo-fence threshold 239 for use in confirming delivery of the shipment, and a confirmation token 241 that can be used to confirm delivery. Other information can also be included in the shipment record 219, such as an order identifier linking the shipment record 219 to a particular order or orders or a listing of items included in the shipment.

The destination 233 represents the location where the shipment will be delivered. The destination 233 can be represented in one or more formats, such as an address, a pair of coordinates (e.g., latitude and longitude), or another representation. The destination 233 can also include information about the location where the shipment will be delivered, such as the type of building (e.g., house, apartment building, office building, office park, shopping mall, etc.), a location in the building (e.g., floor, suite, etc.), special delivery instructions for the destination 233, and other information. In some instances, the destination 233 can also include data defining or describing the boundaries of a virtual perimeter surrounding the destination 233 to form a geo-fenced area associated with the destination 233. The virtual perimeter can form a variety of shapes (e.g., circle, rectangle, triangle, sphere, tetrahedron, cube, polyhedron etc.) or other polygons (e.g., irregular polygons or irregular polyhedrons).

The record for the recipient 236 represents the individual (e.g., consumer or retail shipment) or entity (e.g., commercial or business shipment) receiving the shipment. Various information can be stored about the recipient 236. For example, the recipient 236 can include a device identifier 223 that identifies the device record 216 for the client computing device 206 that a customer will use to confirm delivery of the shipment. The record for the recipient 236 can also store other information, such as whether previous deliveries to the recipient 236 have been reported as undelivered or the number or frequency of deliveries to the recipient 236 reported as undelivered.

Figure 3:
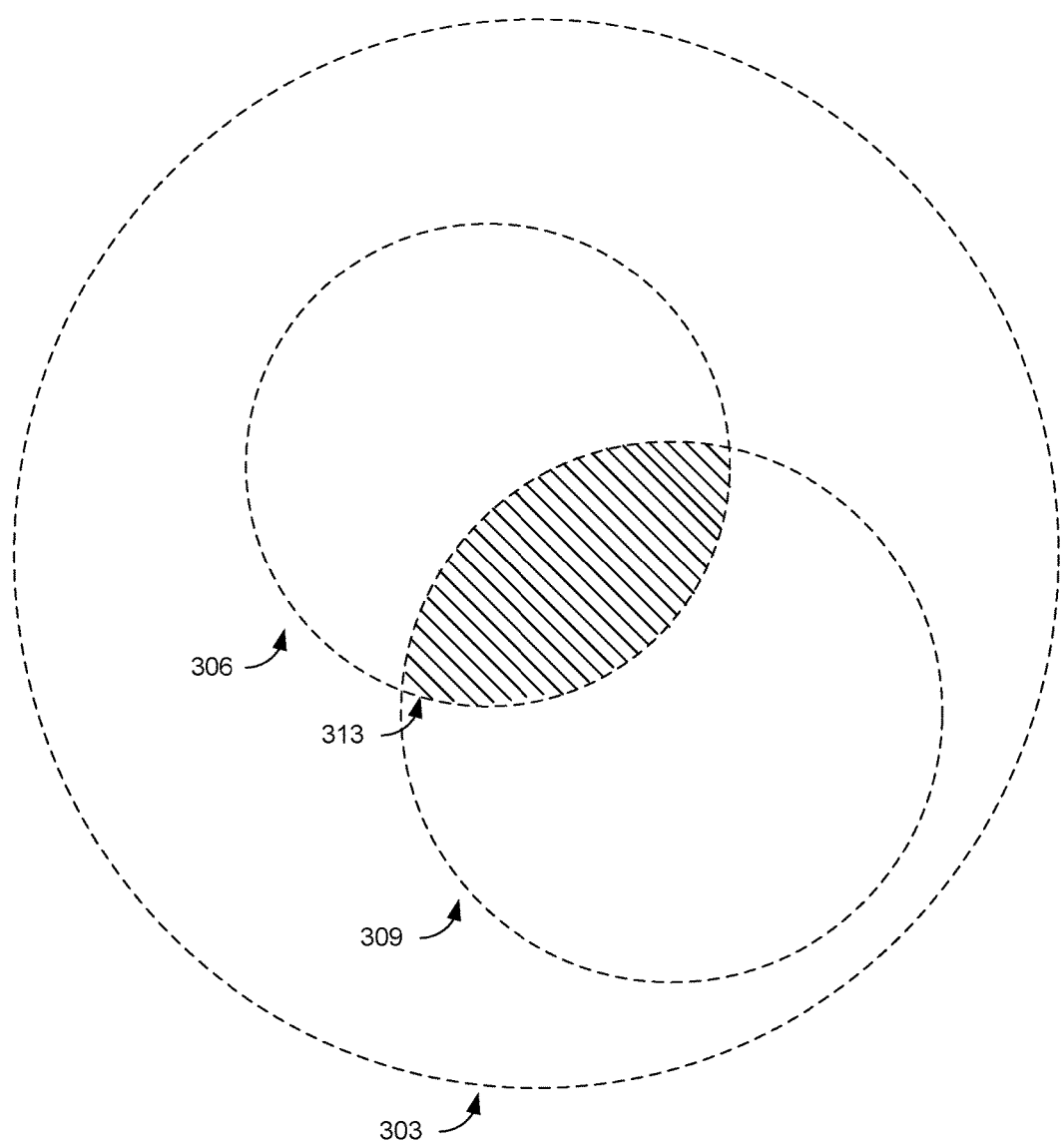
FIG. 3 is an illustration of the use of geo-fences to confirm delivery of a shipment.

The geo-fence threshold 239 represents the proximity that client computing devices 206 must be with respect to each other or the proximity that client computing devices 206 must be with respect to the destination 233. For example, the geo-fence threshold 239 can specify that a client computing device 206 of a delivery agent 221 and a client computing device 206 of a recipient 236 must be within a particular distance of each other. As an alternative, the geo-fence threshold 239 can specify the percentage of overlap between a geo-fenced area centered on the client computing device 206 of the delivery agent 221 and another geo-fenced area centered on the client computing device 206 of the recipient 236. An example of this alternative is illustrated in FIG. 3. In a further example, the geo-fence threshold 239 can specify that the client computing devices 206 of the recipient 236 and the delivery agent 221 be within a specific distance of the destination 233. Likewise, the geo-fence threshold 239 can specify the percentage of overlap between a geo-fenced area centered on the client computing device 206 of the delivery agent 221 and another geo-fenced area centered on the destination 233. A similar geo-fence threshold 239 could be specified for a client computing device 206 of the recipient.

The confirmation token 241 represents a token that can be exchanged between two or more client computing devices 206 to confirm that a delivery of a shipment has occurred. The confirmation token 241 can be generated by the delivery confirmation application 246 or by an application executing on the client computing device 206, such as the client application 253. For example, in some instances, the delivery confirmation application 246 can generate the confirmation token 241 in response to creation of a shipment record 219 for a shipment. The delivery confirmation application 246 can then provide the confirmation token 241 to one or more client computing devices 206. In other instances, the client application 253 can create the confirmation token 246 in response to a request to provide a confirmation token 246 to the other client computing device 206. The confirmation token 241 can include a numeric personal identification number (PIN), an alphanumeric passcode, a device fingerprint (e.g., a combination of the device identifier 223, an identifier of the shipment record 219 and potentially other data), or a binary data value that can be used to confirm that a delivery of shipment has occurred.

A record for the delivery agent 221 represents the individual delivering a shipment 219 to a recipient 236. The record for the delivery agent 221 can include a device identifier 223 of a client computing device 206 associated with the delivery agent, such as a mobile computing device. The record for the delivery agent 221 can also include one or more shipment records 219 representing shipments of items to be delivered by the delivery agent 221.

The components executed on the computing environment 203, for example, include the delivery confirmation application 246 and other applications, services, processes, systems, engines, or functionality not discussed in detail herein. The delivery confirmation application 246 is executed to confirm that a shipment was delivered to the correct destination 233 based at least in part on the use of geo-fences, as further described herein.

The client computing device 206 is representative of a plurality of client computing devices that may be coupled to the network 209. The client computing device 206 may include, for example, a processor-based system such as a computer system. Such a computer system may be embodied in the form of a mobile computing device 100 (FIG. 1) (e.g., cellular telephones, smartphones, personal digital assistants, web pads, or tablet computer systems), a wearable computing device (e.g., smart watch, smart goggles, or smart glasses), a desktop computer, a laptop computer, personal digital assistants, set-top boxes, music players, game consoles, electronic book readers, home automation or smart home devices (e.g., smart bulbs, smart doorbells, door and window sensors, or other devices), various embedded computing devices, or other devices with like capability. The client computing device 206 may include a display. The display may include, for example, one or more devices such as liquid crystal display (LCD) displays, gas plasma-based flat panel displays, organic light emitting diode (OLED) displays, electrophoretic ink (E ink) displays, LCD projectors, or other types of display devices.

Various data is stored in a client data store 249 that is accessible to the client computing device 206. The client data store 249 may be representative of a plurality of client data stores 249 as can be appreciated. The data stored in the client data store 249, for example, is associated with the operation of the various applications or functional entities described below. The data stored in the client data store 249 includes, for example, the device identifier 223 of the client computing device 206, the current location 226 of the client computing device 206, and a confirmation token 241 stored on the client computing device 206.

The client computing device 206 may be configured to execute various applications such as a client application 253 or other applications. The client application 253 may be executed in a client computing device 206, for example, to access network content served up by the computing environment 203 or other servers, thereby rendering a user interface on the display. To this end, the client application 253 may include, for example, a browser, or a dedicated application and the user interface may include a network page, an application screen, or other interface. The client application 253 can also be configured to report information about the client computing device 206, such as the current location 236 of the client computing device 206, to the delivery confirmation application 246. In some instances, the client application 253 can also be configured to calculate the current location 226 of the client computing device 206 based on cellular towers or Wi-Fi access points visible to the client computing device 206 using various multilateration approaches. In other instances, the client application 253 can be configured to retrieve the current location 226 of the client computing device 206 from a geolocation circuit included in the client computing device 206. The client computing device 206 may be configured to execute applications beyond the client application 253 such as email applications, social networking applications, word processors, spreadsheets, and/or other applications.

Next, a general description of the operation of the various components of the networked environment 200 is provided. To begin, a shipment record 219 is created for a corresponding shipment of items to a recipient 236. The shipment record 219 can be created as a result of a number of processes.

As a first example, a sender could schedule a package for delivery using a common carrier (e.g., postal service, parcel carrier, courier company, etc.). The shipment record 219 could automatically be created by the logistics systems of the common carrier once the common carrier receives the package for shipment. For example, the shipment record 219 could be created when a customer drops off a package at customer service center of the common carrier or when the common carrier retrieves the package from a depository (e.g., a post box, mail box, or other drop-off box).

As a second example, a customer could place one or more orders with an electronic commerce application. The electronic commerce application is executed in order to facilitate the online purchase of items over the network 209. Accordingly, the electronic commerce application can be executed in the computing environment 203. The electronic commerce application also performs various backend functions associated with the online presence of a merchant in order to facilitate the online purchase of items. For example, the electronic commerce application can generate network pages such as web pages or other types of network content that are provided to client computing devices 206 for the purposes of selecting items for purchase, rental, lease, or other form of consumption.

After the order is placed and confirmed, the electronic commerce application creates a corresponding shipment record 219 for a shipment containing one or more items in the order. In creating the shipment record 219, the electronic commerce application can include the destination 233 for the shipment provided by the customer placing the order, an identifier of a recipient 236 of the order (which may or may not be different from the customer placing the order).

After the shipment record 219 is created, the delivery confirmation application 246 is notified of the newly created shipment record 219. The delivery confirmation application 246 in turn analyzes the shipment record 219 to determine one or more appropriate geo-fence thresholds 239 to be assigned to the shipment record 219.

The geo-fence threshold 239 can be specified based at least in part on one or more criteria. In many instances, a default geo-fence threshold 239 that has been empirically determined will be used. For example, in the case of unattended deliveries, a single geo-fence threshold 239 specifying that a client computing device 206 of a delivery agent 221 must be within a particular distance of the destination 233 can be used in order to confirm a delivery. As another example for unattended deliveries, a single geo-fence threshold 239 specifying that a particular percentage of a geo-fenced area centered on the client computing device 206 must be within a geo-fenced area centered on the destination 233 can be used in order to confirm a delivery. Likewise, in the case of attended deliveries, a single geo-fence threshold 239 specifying that a client computing device 206 of a delivery agent 221 must be within a particular distance of a client computing device 206 of the recipient 236, or vice versa, can be used in order to confirm delivery. In some situations, both variations of this geo-fence threshold 239 can be used together to ensure that both the delivery agent 221 and the recipient 236 are within a desired proximity of each other at the time of delivery. Attended deliveries can further use a geo-fence threshold 239 that specifies that a particular percentage of a geo-fenced area centered on the client computing device 206 of the delivery agent 221 or the recipient 236 must be within a geo-fenced area centered on the destination 233 in order to confirm a delivery.

However, the delivery confirmation application 246 can assign non-default geo-fence thresholds 239 based on one or more criteria. For example, if the value of the items being shipped exceeds a specified monetary amount, the delivery confirmation application 246 can specify more precise geo-fence thresholds 239. For example, the delivery confirmation application 246 could specify a shorter distance between the client computing device 206 of the delivery agent 221 and either the destination 233 or the client computing device 206 of the recipient 236. Similarly, the delivery confirmation application 246 could specify higher percentages of overlap between a geo-fenced area centered on the delivery agent 221 and a geo-fenced area centered on the destination 233 or the client computing device 206 of the recipient. Similar modifications could be made based on other criteria, such as the type of items in the shipment (e.g., hazardous materials), type of delivery location, delivery agent history or customer history (e.g., customer has suffered from repeated misdeliveries of shipments).

The delivery confirmation application 246 can at this point also generate a confirmation token 241 for the shipment record 219. Depending on the particular embodiment of the disclosure, the delivery confirmation application 246 can send the confirmation token 241 to the client computing device 206 of the recipient 236 for the use of the recipient 236 in confirming delivery of the shipment. In other instances, the delivery confirmation application 246 can wait until the shipment has been assigned to a last-mile carrier and is in the possession of a delivery agent 221 tasked with delivering the shipment to the recipient 236. Once the delivery confirmation application 246 has been notified that the delivery agent 221 is in possession of the shipment (e.g., from a client application 253 installed on the client computing device 206 of the delivery agent 221 or from a larger shipment tracking system), the delivery confirmation application 246 can send the confirmation token 241 to the client computing device 206 for later use in confirming delivery of the shipment.

In the event that the delivery is an attended delivery, the delivery confirmation application 246 can monitor the current location 226 of the client computing device 206 of the recipient 236 and the current location 226 of the client computing device 206 of the delivery agent 221 in order to confirm delivery of the shipment. In some instances, the delivery confirmation application 246 can receive a periodic report from a client application 253 on the client computing device 206 of the current location 226 of the client computing device 206. For example, the client application 253 may routinely query geolocation circuitry on the client computing device 206 to determine the current location 226 of the client computing device 206 and report that current location 226 to the delivery confirmation application 246. As another example, the delivery confirmation application 246 may instead periodically query the client application 253 executing on the client computing device 206 for the current location 226 of the client computing device 206. In response to the query, the client application 253 could query geolocation circuitry on the client computing device 206 to determine the current location 226 of the client computing device 206 and report that current location 226 to the delivery confirmation application 246.

Reports of the current location 226 of the client computing devices 206 to the delivery confirmation application 246 may be synchronized. For example, the client applications 253 executing on the client computing device 206 of the recipient 236 and the client computing device 206 of the delivery agent 221 can be configured to report the respective current locations 226 with the same frequency or at the same time. This synchronization allows the delivery confirmation application 246 to determine whether the client computing device 206 of the recipient and the client computing device 206 of the delivery agent 221 are in proximity to each other or at the destination 233 at the same time instead of different times.

The delivery confirmation application 246 can monitor the current locations 226 of the respective client computing devices 206 of the recipient 236 and the delivery agent 221. In response to receiving a delivery notification from the client computing device 206 of the delivery agent, the delivery confirmation application 246 can determine whether the client computing device 206 of the delivery agent 221 is at a location that places the client computing device 206 of the delivery agent 221 within an appropriate geo-fence threshold 239 with respect to the destination 233 or the client computing device 206 of the recipient. In some instances, the delivery confirmation application 246 can further check to determine whether client computing devices 206 were in proximity to each other at or near the time that the delivery notification was sent.

This could include determining if, within a given time window, the current location 226 of the recipient 236 and the current location 226 of the delivery agent 221 were within a predefined distance of the destination 233. As another example, this could include determining if, within a given time window, a minimum percentage of a geo-fenced area, as specified by a predefined threshold, surrounding with the recipient 236 is within a geo-fenced area associated with the destination 233. Likewise, a determination could also be made for the same given time window whether a minimum percentage of a geo-fenced area, as specified by a predefined threshold, surrounding the delivery agent 221 is within a geo-fenced area associated with the destination 233.

By using time windows, the delivery confirmation application 246 can rely on the most recently received current location 226 of a client device 206. For instance, a client device 206 may have a poor network 109 connection (e.g., cellular network "dead zone") and be unable to communicate its current location 226 to the delivery confirmation application 246. However, so long as the delivery confirmation application 246 has received at least one reported current location 226 of the client device 206 within the time window, the delivery confirmation application 246 can attempt to determine if the client device 206 of the recipient 236 was at the destination 233 at the same time as the client device 206 of the delivery agent 221.

If the client computing devices 206 were in proximity to each other and/or in proximity to the destination 233, as defined by an applicable geo-fence threshold 239, at or near the time the delivery notification was sent, then the delivery confirmation application 246 can confirm that the shipment was delivered. Confirmation can include sending a confirmation message to the delivery agent 221 or the recipient 236.

However, in some instances, the delivery confirmation application 246 may be unable to receive the current location 226 from the client computing device 206 of the delivery agent 221 or the recipient 236. Likewise, the delivery confirmation application 246 may also be unable to receive a delivery notification from the client computing device 206 of the delivery agent 221. These situations can occur, for example, when there is no access to the network 209 at or near the destination 233. For example, the destination may be located in a cellular "dead spot." Further, even if there is other wireless network 209 access (e.g., Wi-Fi), there is no guarantee that both client computing devices 206 will be able to access the other wireless network 209. For example, the client computing device 206 of the delivery agent 221 may not be able or authorized to access a home or personal Wi-Fi network of a recipient 236. Likewise, access to a business Wi-Fi network may be unauthorized for third-parties for security concerns.

In these cases, the confirmation token 241 can be exchanged at the time of delivery. After the confirmation token 241 is exchanged, the exchange of confirmation tokens can be reported to the delivery confirmation application 246 at a later time. Once the delivery confirmation application 246 receives a notification of the exchange of the confirmation token 241, the delivery confirmation application 246 can then confirm the delivery. As part of the confirmation process, a confirmation message can be sent to the client computing device 206 of the recipient 236 or the delivery agent 221.

In one example, the delivery confirmation application 246 can provide the confirmation token 241 to a client computing device 206 assigned to a delivery agent 221. When the delivery agent 221 arrives to deliver the shipment, the confirmation token 241 can be transferred from the client computing device 206 of the delivery agent 221 to the client computing device 206 of the recipient 236. Later, when the client computing device 206 regains access to the network 209, the client computing device 206 could provide a delivery notification to the delivery confirmation application 246. The delivery notification could include an identifier for the shipment record 219 and a confirmation token 241 associated with the shipment record 219. Because client computing device 206 of the recipient 236 was not issued the confirmation token 241, the presence of the confirmation token 241 within the delivery notification sent to the delivery confirmation application 246 authenticates that a delivery of the shipment took place. The confirmation token 241 could be transferred in a number of ways, including the reverse of the example provided above.

For example, the confirmation token 241 could be wirelessly sent from the client computing device 206 of the recipient 236 to the client computing device 206 of the delivery agent 221. To initiate the transfer, the recipient 236 could manipulate a user interface presented by the client application 253. The transfer could make use of a number of low power, short-distance transmission technologies, including near field communication (NFC) transmission, BLUETOOTH® transmission, Wi-Fi direct transmission, infrared transmission, acoustic transmission (e.g., audio transmission of data between the two client computing devices 206 using ultrasonic or subsonic frequencies), or another approach.

As another example, the confirmation token 241 could be exchanged between client computing devices 206 using images, such as matrix-style bar codes including Quick Response ("QR") codes. This example could be used when one or both client computing devices 206 lack wireless data transmission functionality. For example, low cost smartphones and other mobile computing devices may omit NFC or BLUETOOTH circuitry. To initiate a transfer of the confirmation token 241, the recipient 236 could manipulate a user interface presented by the client application 253 to cause the client application 253 to generate a QR code representing the confirmation token 241. The delivery agent 221 could then manipulate a user interface presented by the client application 253 to cause a camera on the delivery agent's client computing device 206 to capture an image of the QR code presented on the display of the client computing device 206 of the recipient 236. The client application 253 on the client computing device 206 of the delivery agent 221 could then decode the QR code to extract the confirmation token 241 and store the confirmation token 241.

In a similar example, the confirmation token 241 could correspond to an alphanumeric passphrase, pass code, or personal identification number (PIN). To initiate a transfer of the confirmation token 241, the recipient 236 could manipulate a user interface presented by the client application 253 to cause the client application 253 to render the confirmation token 241 on the display of the client computing device 206 of the recipient 236. The delivery agent 221 could then transcribe the confirmation token 241 using a user interface provided by the client application 253 executing on the client computing device 206 of the delivery agent 221. The client application 253 could then save the confirmation token 241 entered.

Referring next to FIG. 3, shown is an example of how one or more geo-fences can be used to confirm delivery of a shipment. A first geo-fence 303 shaped as a circle is centered on the destination 233 (FIG. 2). Other shapes may be employed depending on the particular destination 233, such as squares, rectangles, or irregular polygons. Within the first geo-fence 303 is a second geo-fence 306 centered on the client computing device 206 (FIG. 2) associated with the recipient 236 (FIG. 2) and a third geo-fence 309 centered on the client computing device 206 associated with the delivery agent 221 (FIG. 2). In this illustration, both the second geo-fence 306 and the third geo-fence 309 are also shaped as circles. An overlap 313 between the second geo-fence 306 and third geo-fence 309 is shaded to emphasize the overlap 313.

In the example illustrated, several determinations could be made using the delivery confirmation application 246 (FIG. 2). First, a determination could be made that both the recipient 236 and the delivery agent 221 are at the destination 233 at the same time or within the same window of time. This could indicate that a delivery was made at the correct destination 233. Second, if the overlap 313 exceeds the geo-fence threshold 239, then a determination could be made that the recipient 236 and the delivery agent 221 are in close enough proximity to each other that a delivery was personally made to the recipient 236 by the delivery agent 221.

Figure 4:
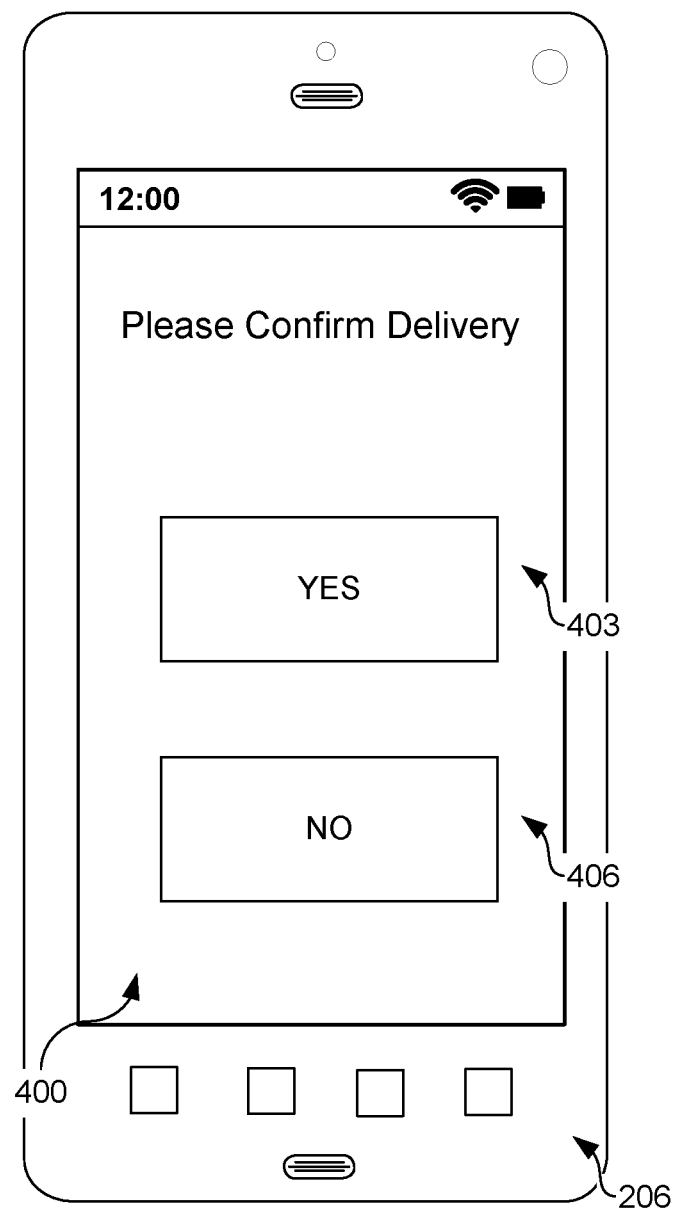
FIG. 4 is a pictorial diagram of an example user interface rendered by a client in the networked environment of FIG. 2 according to various embodiments of the present disclosure.

Turning now to FIG. 4, shown is a user interface diagram depicting an example of a user interface 400 rendered on the client computing device 206 by the client application 253 (FIG. 2). The user interface 400 is an example of an interface that a recipient 236 (FIG. 2) could manipulate to transfer a confirmation token 241 (FIG. 2) to a client computing device 206 of a delivery agent 221 (FIG. 2). The user interface 400 can include a first interface element 403 and a second interface element 406. To transfer the confirmation token 241, the recipient 236 can tap, press, or otherwise manipulate the first interface element 403, which initiates a transfer of the confirmation token to the client computing device 206 of the delivery agent 221. If there is something wrong with the shipment (e.g., items missing, misaddressed package, or other error), the recipient 236 can manipulate the second interface element 406 to refuse or decline delivery. This may initiate an error handling process in some embodiments.

Figure 5:
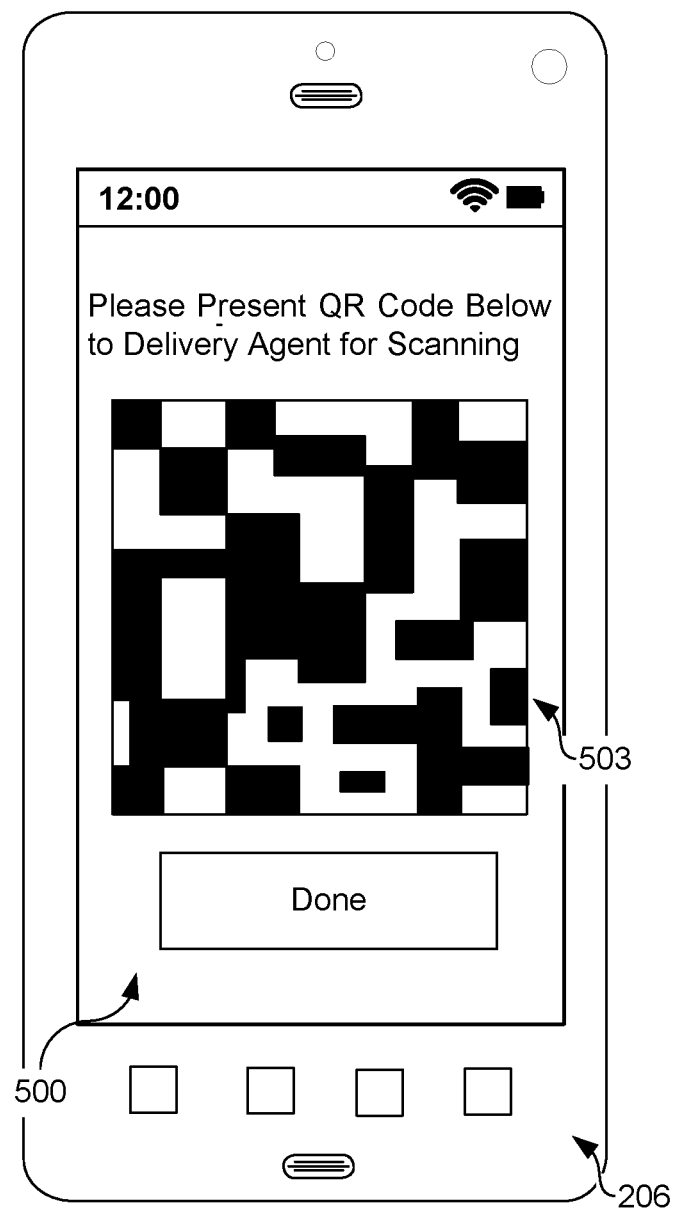
FIG. 5 is a pictorial diagram of an example user interface rendered by a client in the networked environment of FIG. 2 according to various embodiments of the present disclosure.

Moving on to FIG. 5, shown is a user interface diagram depicting an example of a user interface 500 rendered on the client computing device 206 by the client application 253 (FIG. 2). The user interface 500 includes a confirmation token 241 (FIG. 2) rendered as a QR code 503. The QR code 503 can be photographed or otherwise scanned by the client computing device 206 of the delivery agent 221 to transfer the confirmation token 241.

Figure 6:
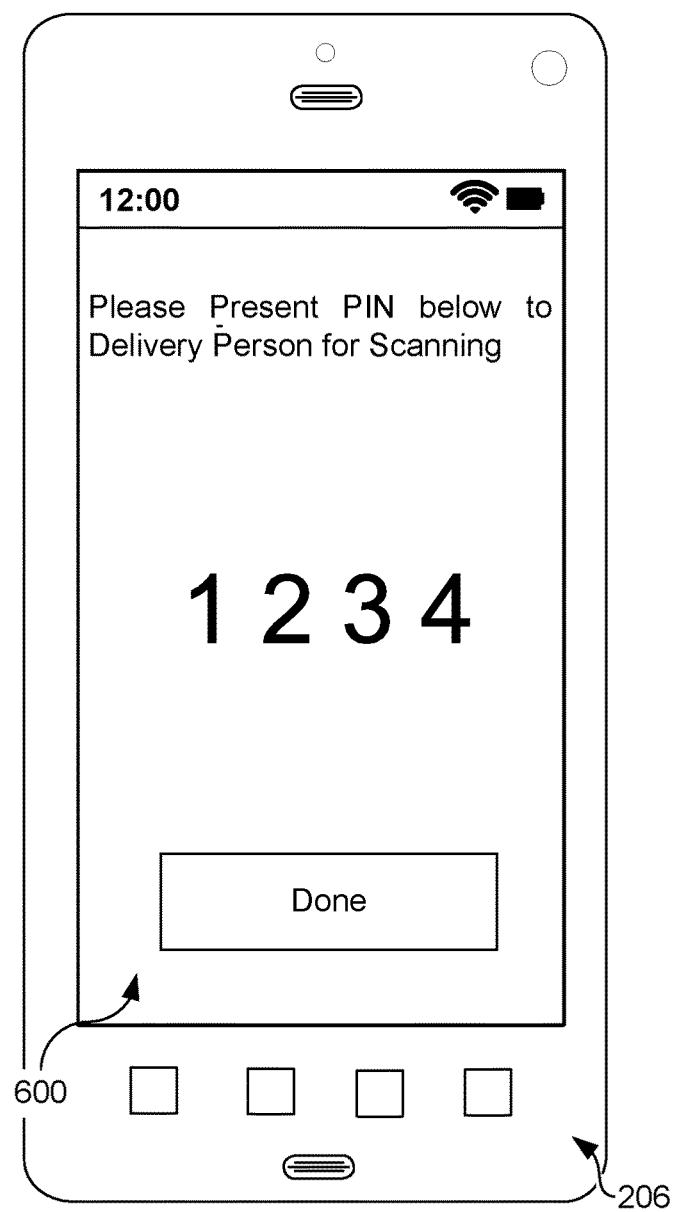
FIG. 6 is a pictorial diagram of an example user interface rendered by a client in the networked environment of FIG. 2 according to various embodiments of the present disclosure.

Proceeding to FIG. 6, shown is a user interface diagram depicting an example of a user interface 600 rendered on the client computing device 206 by the client application 253 (FIG. 2). The user interface 600 includes a confirmation token 241 (FIG. 2) rendered as a numeric PIN. However, a similar interface can be used for embodiments that use an alphanumeric passcode. The PIN can be photographed or otherwise scanned by the client computing device 206 of the delivery agent 221 to transfer the confirmation token 241.

Figure 7:
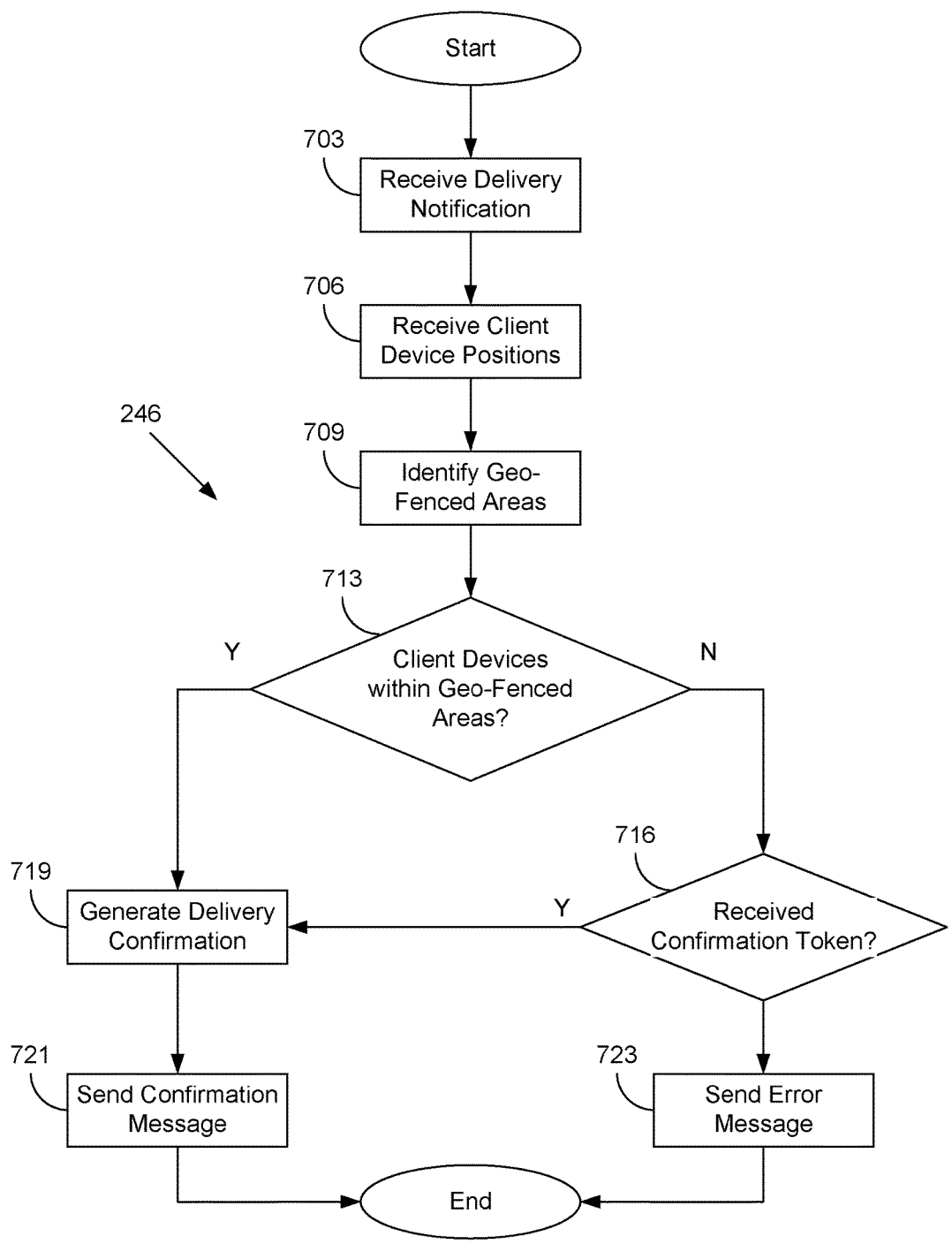
FIG. 7 is a flowchart illustrating one example of functionality implemented as portions of an application executed in a computing environment in the networked environment of FIG. 2 according to various embodiments of the present disclosure.

Referring next to FIG. 7, shown is a flowchart that provides one example of the operation of a portion of the delivery confirmation application 246 according to various embodiments. It is understood that the flowchart of FIG. 7 provides merely an example of the many different types of functional arrangements that may be employed to implement the operation of the portion of the delivery confirmation application 246 as described herein. As an alternative, the flowchart of FIG. 7 may be viewed as depicting an example of elements of a method implemented in the computing environment 203 (FIG. 2) according to one or more embodiments.

Beginning with box 703, the delivery confirmation application 246 receives a delivery notification from a client computing device 206 (FIG. 2). The client computing device 206 can be linked to either the recipient 236 (FIG. 2) or the delivery agent, depending on the implementation. In some implementations, the client computing device 206 of the recipient 236 could provide the delivery notification. This configuration allows for the recipient 236 to confirm receipt of a shipment. Accordingly, the occurrence of misdelivered shipments could be reduced because only the correct recipient 236 could confirm receipt by sending a delivery notification. In other implementations, however, the client computing device 206 of the delivery agent 221 (FIG. 2) could provide the delivery notification. These implementations could be used to reduce instances of fraud, where a recipient 236 reports a shipment as undelivered or missing items when, in fact, the shipment was actually delivered. In some instances, a combination of these implementations can be used, where client computing device 206 of both the recipient 236 and the delivery agent 221 each send a delivery notification to the delivery confirmation application 246.

The delivery notification can include various information about the shipment being delivered. For example, the delivery notification can include an identifier for a corresponding shipment record 219 (FIG. 2), a status indicating whether the shipment was partially or completely delivered, a time of delivery, the current location 226 (FIG. 2) of the client computing device 206 at the time of the delivery, a confirmation token 241 (FIG. 2), or potentially other data.

After receiving all of the requisite delivery notifications, the process proceeds to box 706. Here, the delivery confirmation application 246 receives the current location 226 of the client computing device 206 of the recipient 236 and the current location 226 of the client computing device 206 of the delivery agent 221. The current location 226 may be received or otherwise acquired in one or more ways.

As a first example, the delivery notification may include the current location 226 of the client computing device 206 that provided the delivery notification. Accordingly, the current location 226 of the client computing device 206 may be provided to the delivery confirmation application 246 concurrently with the delivery notification.

Second, the delivery confirmation application 246 may query the client computing device 206 of the recipient 236 and the client computing device 206 of the delivery agent 221 for their respective current locations 226. For example, the delivery confirmation application 246 could send a request to the client application 253 executing on a client computing device 206. In response to receipt of the request, the client application 253 could determine the current location 226 of the client computing device 206 and provide the determined current location 226 to the delivery confirmation application 246.

Third, the delivery confirmation application 246 may receive the current location 226 of client computing devices 206 on a regular basis. In this example, each client computing device 206 may be configured to report its current location 226 at a predefined periodic interval (e.g., every 30 seconds, every minute, every five minutes, etc.). In this example, the delivery confirmation application 246 can use the latest current location 226 received from a client computing device 206 as an approximation for its current location 226. In some instances, client computing devices 206 may be synchronized to report their current location 226 at approximately the same time in order to increase the accuracy of determining whether two client computing devices 206 were at the same destination 233 (FIG. 2) within the same time-window or were in proximity to each other in the same time-window.

Moving on to box 709, the delivery confirmation application 246 determines the geo-fenced areas to be used for confirming delivery. For example, the delivery confirmation application 246 may plot an area centered on a destination 233 of a shipment using a geo-fence threshold 239 (FIG. 2) that defines the distance from the destination 233 to the boundary of the geo-fenced area. Similarly, the delivery confirmation application 246 can plot an area centered on the current location 226 of a client computing device 206, such as the client computing device 206 of the recipient 236 or the delivery agent, using a geo-fence threshold 239 that defines the distance from the client computing device 206 to the boundary of the geo-fenced area.

Referring next to box 713, the delivery confirmation application 246 determines whether the client computing device 206 of the delivery agent 221 and the client computing device 206 of the recipient 236 are within the appropriate geo-fenced areas. This determination can be made using several approaches. If one or more of the client computing devices 206 are not within the appropriate geo-fenced areas, execution proceeds to box 716. Likewise, if the delivery confirmation application 246 is unable to determine whether one or more client computing devices 206 are within the appropriate geo-fenced areas, execution proceeds to box 716. For example, the delivery confirmation application 246 may be unable to determine whether one or more client computing devices 206 are within the appropriate geo-fenced areas if the client computing devices 206 are unable to connect to a network 209 (FIG. 2).

A first approach that the delivery confirmation application 246 could use would be to compare the current location 226 of each client computing device 206 with the destination 233. In this approach, the geo-fence threshold 239 could represent a maximum allowable distance between each client computing device 206 and the destination 233. For example, if the geo-fence threshold 239 for the destination 233 were 100 feet, the delivery confirmation application 246 could determine whether each client computing device 206 is less than 100 feet from the destination 233. Likewise, if the geo-fence threshold 239 for a client computing device 206 were 15 feet, then the delivery confirmation application 246 could determine whether the client computing device 206 of the recipient 236 was within 15 feet of the client computing device 206 of the delivery agent 221. Other distances could also be used, depending on the particular circumstances.

A second approach that the delivery confirmation application 246 could use would be to determine whether a degree or amount of overlap between two geo-fenced areas exists. In this approach, the geo-fence threshold 239 could represent a minimum percentage of overlap between two geo-fenced areas. For example, the geo-fence threshold 239 linked to the destination 233 could specify at least a 90% overlap. In this example, if at least 90% of a first geo-fenced area centered on the client computing device 206 of the recipient 236 were within a second geo-fenced area centered on the destination 233, the delivery confirmation application 246 could determine that the recipient was at the destination 233. A similar approach could be used with respect to a client computing device 206 of a delivery agent 221 to determine whether the delivery agent 221 was at the destination 233. As another example, the geo-fence threshold 239 linked to the client computing device 206 of the recipient 236 could specify at least a 50% overlap. In this example, if at least 50% of a first geo-fenced area centered on the client computing device 206 of the recipient 236 overlapped with a second geo-fenced area centered on the client computing device 206 of the delivery agent, then the delivery confirmation application 246 could determine that a delivery was likely made due to the proximity of the recipient 236 and the delivery agent 221. Other percentages for the geo-fence threshold 239 could also be used, depending on the circumstances.

Moving on to box 716, the delivery confirmation application 246 can also determine whether a confirmation token 241 has been provided by either the client computing device 206 of the recipient 236 or the client computing device of the delivery agent 221. As previously discussed, the use of a confirmation token 241 to confirm a delivery could be used instead of or in addition to the use of geo-fences. For example, if one or both of the client computing devices 206 were unconnected to the network 209 (FIG. 2) at the time of delivery, the delivery confirmation application 246 might be unable to use geo-fenced areas to confirm delivery. As another example, one of the client computing devices 206 could provide the delivery confirmation token 241 to the delivery confirmation application 246 as an additional indication or proof of delivery. In the event that the confirmation token 241 is provided to the delivery confirmation application 246, execution proceeds to box 719. If the confirmation token 241 was not provided to the delivery confirmation application 246, then execution proceeds to box 723.

The delivery confirmation application 246 could receive the confirmation token 241 in a number of ways. For example, the confirmation token 241 could have been included in the delivery notification itself. In other examples, the confirmation token 241 could be separately sent to the delivery confirmation application 246. For example, a client computing device 206 could send the delivery confirmation application 246 in response to receipt of a request for the delivery confirmation token 241 from the delivery confirmation application 246.

If execution proceeds to box 719, the delivery confirmation application 246 generates a delivery confirmation. The delivery confirmation can include information about the delivery, such as when the delivery occurred, what was delivered, the identity of the delivery agent, the identity of the recipient 236, and potentially other information. In some instances, the delivery confirmation application 246 may also change the status of a shipment record 219 (FIG. 2) from "pending," "in transit," or a similar status to "delivered" or a similar status.

When execution proceeds to box 721, the delivery confirmation application 246 sends a confirmation message to the client computing device 206 of the recipient 236 or the client computing device 206 of the delivery agent 221. The delivery confirmation message can include the delivery confirmation and potentially other information. The client computing device 206 that receives the delivery confirmation message can then render the delivery confirmation message in a user interface to notify the user (e.g., the recipient 236 or the delivery agent) that the delivery confirmation application 246 has acknowledged and confirmed the delivery of the shipment. After proceeding down this branch, the process subsequently ends.

However, if execution proceeds to box 723 instead of box 719, then the delivery confirmation application 246 can generate and send an error message to the client computing device 206 of either the recipient 236 or the delivery agent 221. The error message may include information regarding why the delivery confirmation application 246 is unable to confirm delivery. For example, the error message could indicate that the client computing devices 206 of the recipient 236 and delivery agent 221 are too far apart. As another example, the error message could indicate that the client computing device of either the recipient 236 or the delivery agent 221 is not in close enough proximity to the destination 233. In another example, the error message could indicate the destination 233 for the shipment is incorrect (e.g., the delivery agent 221 is attempting to deliver the wrong package). After sending the error message, the process subsequently ends.

Figure 8:
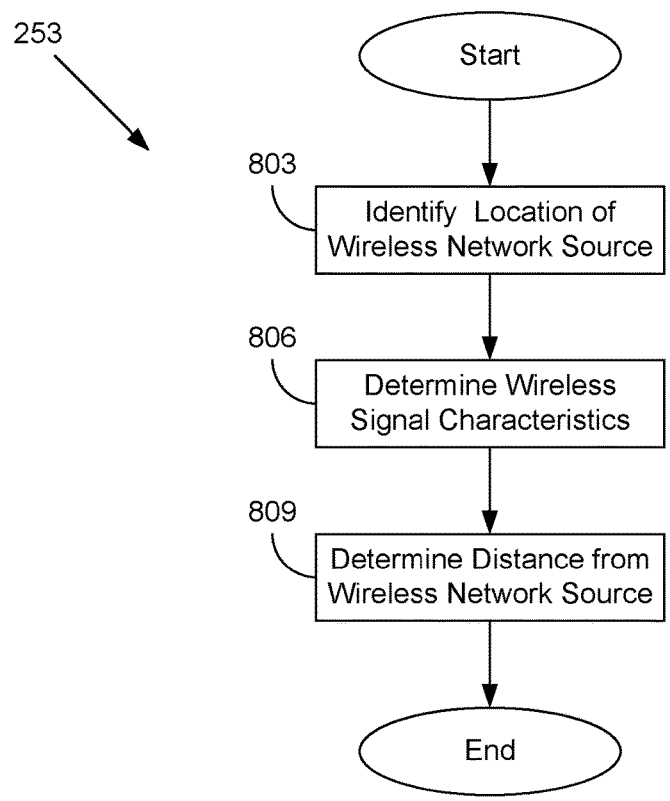
FIG. 8 is a flowchart illustrating one example of functionality implemented as portions of an application executed in the networked environment of FIG. 2 according to various embodiments of the present disclosure.

Referring next to FIG. 8, shown is a flowchart that provides one example of the operation of a portion of the client application 253 to determine distance between a client computing device 206 (FIG. 2) and a wireless network source. To determine the current location 226 (FIG. 2) of the client computing device 206, the process described in FIG. 8 could be repeated multiple times to determine the distance between the client computing device 206 and multiple wireless network sources. Various multilateration approaches could then be used to determine the current location 226 of the client computing device 206. It is understood that the flowchart of FIG. 8 provides merely an example of the many different types of functional arrangements that may be employed to implement the operation of the portion of the client application 253 described herein. As an alternative, the flowchart of FIG. 8 may be viewed as depicting an example of elements of a method implemented in the client computing device 206 (FIG. 2) according to one or more embodiments.

Beginning with box 803, the client application 253 causes the client computing device 206 to identify a location of a wireless network source. The wireless network source could include a base transceiver station (e.g., a cellular network tower), a Wi-Fi access point, or other wireless network source. To determine the location of the wireless network source, the client application 253 could determine a unique identifier for the wireless network source. For example, the client application 253 could determine the media access control (MAC) address for a Wi-Fi access point. The client application 253 could then query a database of known Wi-Fi MAC addresses and locations to determine the location of the Wi-Fi access point. As another example, the client application 253 could determine the Global System for Mobile Communications (GSM) Cell ID (CID) that uniquely identifies a GSM base transceiver station. The client application 253 could then query a database of known GSM CIDs and locations to determine the location of the base transceiver station for the corresponding CID.

Next at box 806, the client application 253 determines various characteristics of the wireless signal received from the wireless network source. For example, the client application 253 could use a received signal strength indicator (RSSI) to determine the strength of the signal received from the wireless network source. The lower the RSSI, the weaker the signal received from the wireless network source and, therefore, the further the client computing device 206 is from the wireless network source. As another example, the client application 253 could determine the angle of arrival (AoA) of a signal received from the wireless network source.

Moving on to box 809, the client application 253 determines the distance between the wireless network source and the client computing device 206. For example, the client application 253 could query a database of wireless network sources to determine, for a given signal strength, an approximate distance from the wireless network source. The distance is approximate because temporary external factors, such as weather or temporary interference from other sources of electromagnetic radiation, could affect the accuracy of the correlation between a signal strength and an approximate distance. However, the approximation may be accurate enough for use in the various embodiments of the present disclosure. As another example, the client application 253 could calculate the distance based on a round trip time to receive a response from the wireless network source. Because the speed of light or other electromagnetic waves is a fixed constant, the distance from the wireless network source could be calculated from the round trip time.

Figure 9:
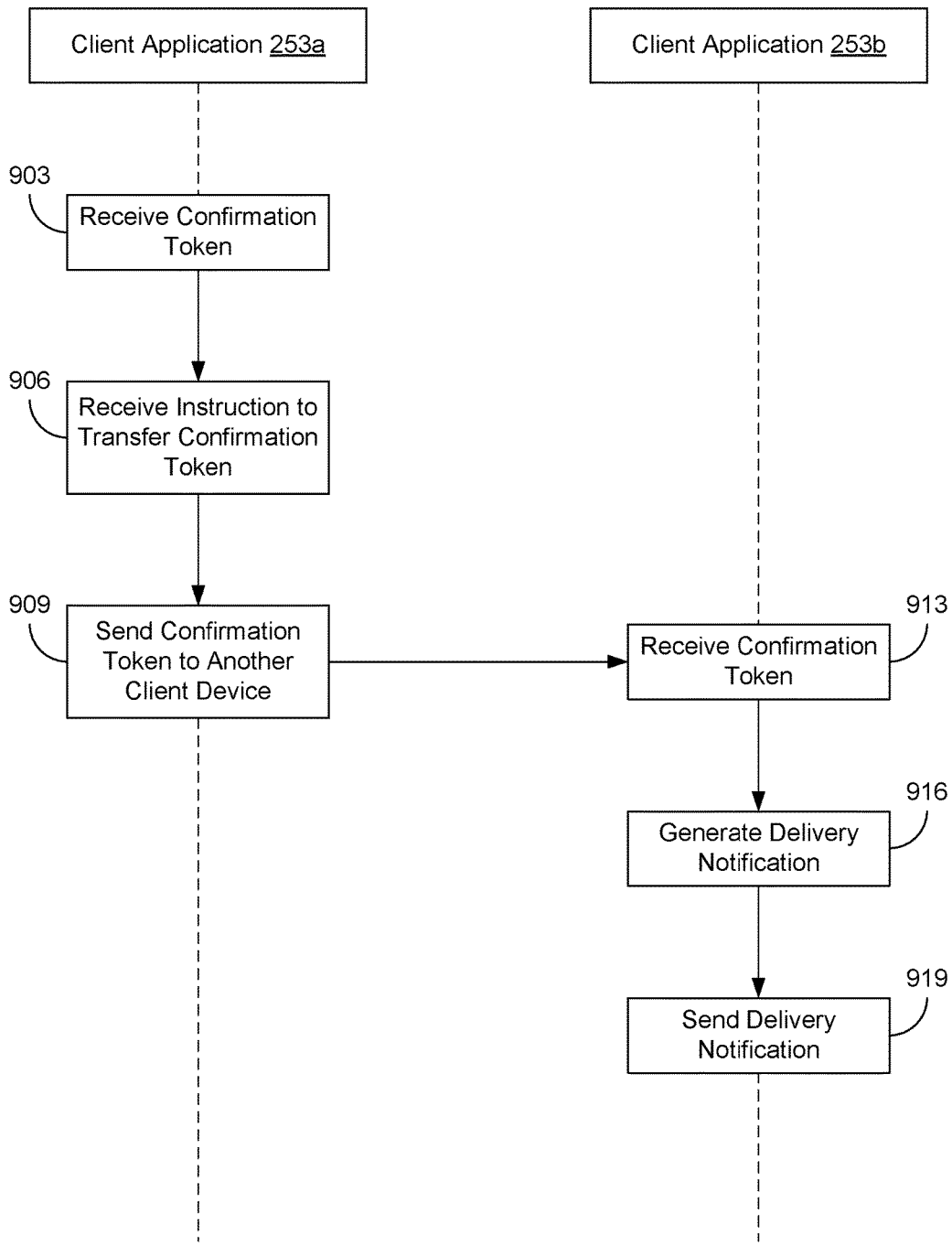
FIG. 9 is a sequence diagram illustrating one example of an interaction between two instances of an application executed in the networked environment of FIG. 2 according to various embodiments of the present disclosure.

Referring next to FIG. 9, shown is a sequence diagram that provides one example of the interaction between two instances of the client application 253*a* and 253*b* executing on separate client computing devices 206 (FIG. 2) to exchange a confirmation token 241 (FIG. 2), according to various embodiments. It is understood that sequence diagram of FIG. 9 provides merely an example of the many different types of functional arrangements that may be employed herein. As an alternative, the sequence diagram of FIG. 9 may be viewed as depicting an example of elements of a method implemented in the networked environment 200 (FIG. 2) according to one or more embodiments.

Beginning with box 903, the client application 253*a* on the first client computing device 206 receives a confirmation token 241. The confirmation token 241 may be generated by the delivery confirmation application 246 (FIG. 2). For example, the confirmation token 241 could be received when a shipment is being delivered. In this instance, the delivery confirmation application 246 would provide the confirmation token 241 to the first client computing device 206 in response to receiving a delivery notification. In some instances, the confirmation token 241 could be generated in response to receiving the delivery notification. In other instances the confirmation token 241 could be generated in advance but provided to the first client computing device 206 in response to the delivery confirmation application 246 receiving the delivery notification.

Proceeding to box 906, the client application 253a receives an instruction to transfer the confirmation token 241 to a second instance of the client application 253b executing on a second client computing device 206. This instruction can be received from several sources. For example, the instruction could be received from a user interface presented with the client computing device 206 to a user. A user manipulation of the user interface could act as an instruction to send the confirmation token 241 to a second instance of the client application 253b executing on a second client computing device 206.

Moving on to box 909, the first instance of the client application 253a sends the confirmation token 241 to the second instance of the client application 253b executing on the second client computing device 206. This can be accomplished several ways. In some instances, one or more of these approaches may be offered as an option in order to allow for the transfer of the confirmation token 241 to occur between a greater range of devices.

In a first example, the confirmation token 241 can be transferred wirelessly using one or more short range wireless protocols, such as NFC, BLUETOOTH®, or Wi-Fi Direct. In this example, the first instance of the client application 253a will cause the first client computing device 206 to connect using a short range wireless protocol. The second client computing device 206 may detect the connection attempt, causing the second instance of the client application 253b to render a user interface prompt on the display of the second client computing device 206. The user interface prompt may ask the user to manipulate the user interface in order to confirm creation of the connection between the first client computing device 206 and the second client computing device 206. Once the connection is created, the first client application 253a can cause the first client computing device 206 to send the confirmation token 241 to the second client computing device 206.

In a second example, the first instance of the client application 253a can cause the confirmation token 241 to be rendered on a display of the first client computing device 206. The confirmation token 241 could be rendered, for example, in the form of a QR code, an alphanumeric passcode, a PIN, or other representation. The confirmation token 241 could be sent when the second client computing device 206 is used to capture an image of the confirmation token 241 or when the confirmation token 241 is manually entered using an interface provided by the second instance of the client application 253b.

Referring next to box 913, the second client application 253b executing on the second client computing device 206 receives the confirmation token 241. The confirmation token 241 could have been received a number of ways, as previously described above, including via a wireless transfer of the confirmation token 241, capturing an image of the confirmation token 241, or manual entry of the confirmation token 241.

Proceeding to box 916, the second client application 253b generates a delivery notification. The delivery notification can include the confirmation token 241 received from the first client computing device. By including the confirmation token 241, the delivery notification can include evidence that a delivery has been made. Were the delivery not made, the confirmation token 241 would not have been transferred from the first client computing device 206 to the second client computing device 206.

Moving on to box 919, the second instance of the client application 253b causes the second client computing device 206 to send the delivery notification to the delivery confirmation application 246. In some embodiments, such as those where the second client computing device 206 lacks access to a network 209 at the time of the delivery, the delivery notification may be stored until access to a network 209 is obtained. Once the second client computing device 206 accesses a network 209 the delivery confirmation can be sent to the delivery confirmation application 246. The process then ends.

It is to be noted that in the case of errors (e.g., application crash or other errors), that the process can be restarted from the beginning. In those embodiments where the confirmation token 241 was generated on demand in response to delivery of a shipment, the client application 253a may request a new confirmation token 241 to be provided by the delivery confirmation application 246. However, in those embodiments where the confirmation token 241 had been stored on the first client computing device 206 prior to the delivery, the process may be restarted from the beginning using the stored confirmation token 241.

Figure 10:
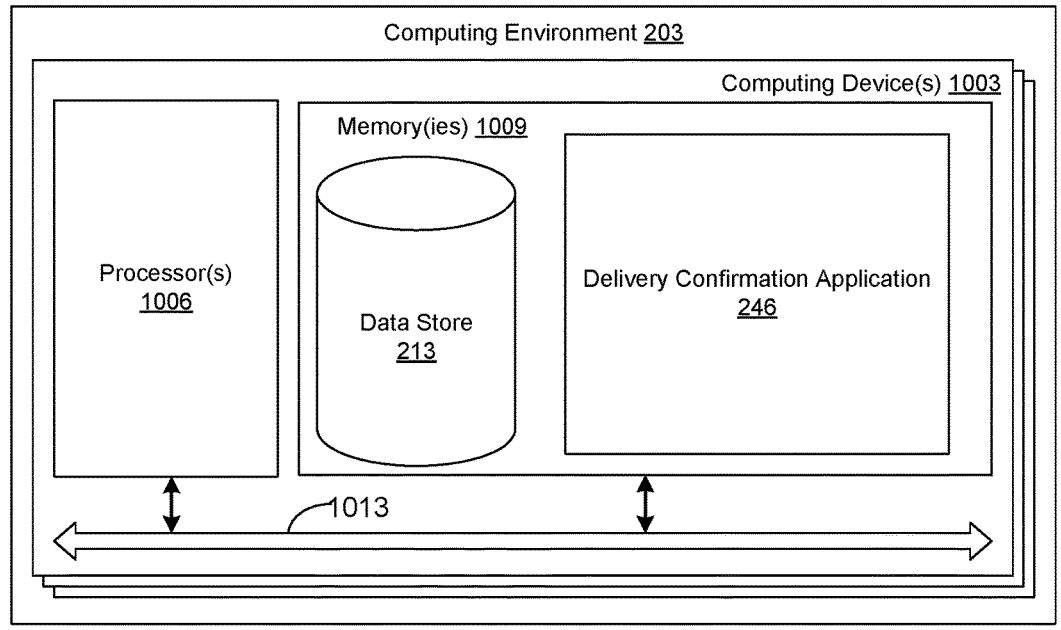
FIG. 10 is a schematic block diagram that provides one example illustration of a computing environment employed in the networked environment of FIG. 2 according to various embodiments of the present disclosure.

With reference to FIG. 10, shown is a schematic block diagram of the computing environment 203 according to an embodiment of the present disclosure. The computing environment 203 includes one or more computing devices 1003. Each computing device 1003 includes at least one processor circuit, for example, having a processor 1006 and a memory 1009, both of which are coupled to a local interface 1013. To this end, each computing device 1003 may include, for example, at least one server computer or like device. The local interface 1013 may include, for example, a data bus with an accompanying address/control bus or other bus structure as can be appreciated.

Stored in the memory 1009 are both data and several components that are executable by the processor 1006. In particular, stored in the memory 1009 and executable by the processor 1006 are the delivery confirmation application 246, and potentially other applications. Also stored in the memory 1009 may be a data store 213 and other data. In addition, an operating system may be stored in the memory 1009 and executable by the processor 1006.

Figure 11:
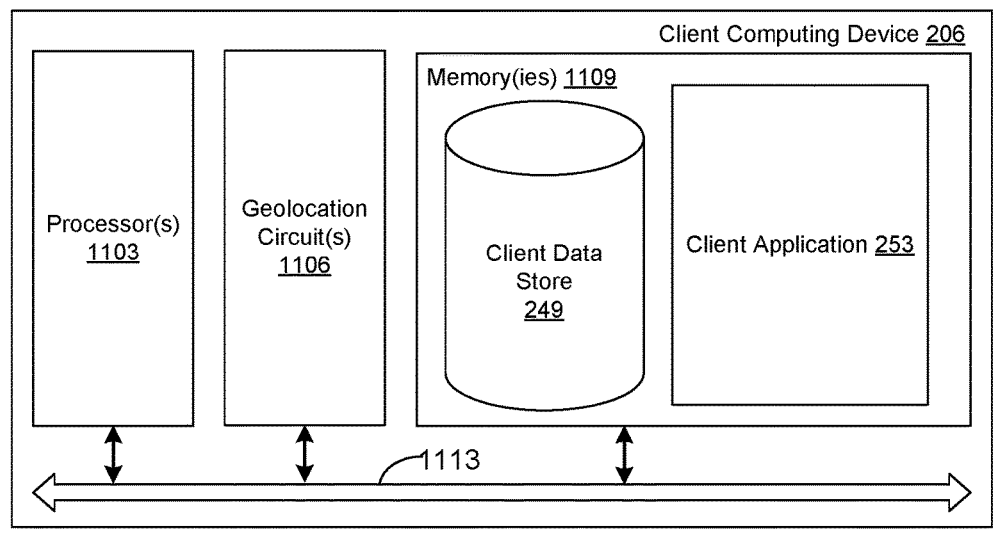
FIG. 11 is a schematic block diagram that provides one example illustration of a client computing device employed in the networked environment of FIG. 2, according to various embodiments of the present disclosure.

With reference to FIG. 11, shown is a schematic block diagram of the client computing device 206 according to an embodiment of the present disclosure. The client computing device 206 includes at least one processor circuit, for example, having a processor 1103, a geolocation circuit 1106, and a memory 1109, all of which are coupled to a local interface 1113. The local interface 1113 may include, for example, a data bus with an accompanying address/control bus or other bus structure as can be appreciated.

Stored in the memory 1109 are both data and several components that are executable by the processor 1103. In particular, stored in the memory 1109 and executable by the processor 1103 are the client application 253 and potentially other applications. Also stored in the memory 1109 may be a client data store 249 and other data. In addition, an operating system may be stored in the memory 1109 and executable by the processor 1103.

The geolocation circuit 1106 can include various circuits for determining the current location of the client computing device 206. For example, the geolocation circuit 1106 can include a radio receiver for a global satellite navigation system, such as a GPS receiver, a GLONASS receiver, or other global satellite navigation system receiver. As another example, the geolocation circuit 1106 can include any circuit capable of analyzing a radio transmission to determine the distance of the client computing device 206 from the source of the radio transmission. Examples of these types of geolocation circuits 1106 include baseband processors, SIM cards, or other network interface cards.

It is understood that there may be other applications that are stored in the memory 1009 and the memory 1109 and are executable by the processor 1006 or the processor 1103 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 1009 or the memory 1109 and are executable by the processor 1006 or processor 1103. In this respect, the term "executable" means a program file that is in a form that can ultimately be run by the processor 1006 or processor 1103. Examples of executable programs may be, for example, a compiled program that can be translated into machine code in a format that can be loaded into a random access portion of the memory 1009 or memory 1109 and run by the processor 1006 or processor 1103, source code that may be expressed in proper format such as object code that is capable of being loaded into a random access portion of the memory 1009 or memory 1109 and executed by the processor 1006 or processor 1103, or source code that may be interpreted by another executable program to generate instructions in a random access portion of the memory 1009 or memory 1109 to be executed by the processor 1006 or processor 1103, etc. An executable program may be stored in any portion or component of the memory 1009 or memory 1109 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1009 and memory 1109 are defined herein as including both volatile and nonvolatile memory and data storage components. Volatile components are those that do not retain data values upon loss of power. Nonvolatile components are those that retain data upon a loss of power. Thus, the memory 1009 and memory 1109 may include, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may include, for example, static random access memory (SRAM), dynamic random access memory (DRAM), or magnetic random access memory (MRAM) and other such devices. The ROM may include, for example, a programmable read-only memory (PROM), an erasable programmable read-only memory (EPROM), an electrically erasable programmable read-only memory (EEPROM), or other like memory device.

Also, the processor 1006 and processor 1103 may represent multiple processors 1006 or multiple processors 1103 and/or multiple processor cores and the memory 1009 and memory 1109 may represent multiple memories 1009 or memories 1109 that operate in parallel processing circuits, respectively. In such a case, the local interface 1013 may be an appropriate network that facilitates communication between any two of the multiple processors 1006, between any processor 1006 and any of the memories 1009, or between any two of the memories 1009, etc. The local interface 1013 may include additional systems designed to coordinate this communication, including, for example, performing load balancing. Likewise, the local interface 1113 may be an appropriate network that facilitates communication between any two of the multiple processors 1103, between any processor 1103 and any of the memories 1109, or between any two of the memories 1109, etc. The local interface 1113 may include additional systems designed to coordinate this communication, including, for example, performing load balancing. The processor 1006 or processor 1103 may be of electrical or of some other available construction.

Although the delivery confirmation application 246, the client application 253, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts and sequence diagrams of FIGS. 7, 8, and 9 show the functionality and operation of an implementation of portions of the delivery confirmation application 246 and the client application 253. If embodied in software, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as a processor 1006 or 1103 in a computer system or other system. The machine code may be converted from the source code, etc. If embodied in hardware, each block may represent a circuit or a number of interconnected circuits to implement the specified logical function(s).

Although the flowcharts and sequence diagrams of FIGS. 7, 8, and 9 show a specific order of execution, it is understood that the order of execution may differ from that which is depicted. For example, the order of execution of two or more blocks may be scrambled relative to the order shown. Also, two or more blocks shown in succession in FIGS. 7, 8 and 9 may be executed concurrently or with partial concurrence. Further, in some embodiments, one or more of the blocks shown in FIGS. 7, 8, and 9 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the delivery confirmation application 246 and the client application 253, that includes software or code can be embodied in any non-transitory computer-readable medium for use by or in connection with an instruction execution system such as, for example, a processor 1006 or 1103 in a computer system or other system. In this sense, the logic may include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the delivery confirmation application 246 and the client application 253, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 1003 or client computing device 206, or in multiple computing devices 1003 in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising:
   receiving, via a computing device, a delivery notification from a first mobile computing device;
   requesting, via the computing device, a first multilaterated position of the first mobile computing device from a network provider system, the first multilaterated position being based at least in part on a signal strength of a cellular network access point detectable by the first mobile computing device;
   receiving, via the computing device, the first multilaterated position from the network provider system;
   obtaining, via the computing device, a second multilaterated position of a second mobile computing device from the network provider system;
   determining, via the computing device, that the first multilaterated position of the first mobile computing device is within a threshold distance of the second multilaterated position of the second mobile computing device; and
   generating, via the computing device, a delivery confirmation in response to determining that the first multilaterated position is within the threshold distance of the second multilaterated position.

2. The method of claim 1, wherein obtaining the second multilaterated position further comprises:
   requesting, via the computing device, the second multilaterated position from the network service provider, the second multilaterated position being based at least in part on a round trip time of a radio communication between the second mobile computing device and a cellular network access point detectable by the second mobile computing device; and
   receiving, via the computing device, the second multilaterated position from the network service provider.

3. The method of claim 1, wherein obtaining the second multilaterated position further comprises:
   requesting, via the computing device, the second multilaterated position from the network service provider, the second multilaterated position being based at least in part on a signal strength of a Wi-Fi access point detectable by the second mobile computing device; and
   receiving, via the computing device, the second multilaterated position from the network service provider.

4. The method of claim 1, further comprising sending, via the computing device, the delivery confirmation to the first mobile computing device.

5. The method of claim 1, further comprising sending, via the computing device, the delivery confirmation to the second mobile computing device.

6. The method of claim 1, wherein obtaining the second multilaterated position further comprises:
   requesting, via the computing device, the second multilaterated position from the network service provider, the second multilaterated position being based at least in part on a signal strength of a cellular network access point detectable by the second mobile computing device; and
   receiving, via the computing device, the second multilaterated position from the network service provider.

7. A system comprising:
   a computing device comprising a processor and a memory; and
   machine readable instructions stored in the memory that, when executed by the processor, cause the computing device to at least:
   receive a delivery notification from a first mobile computing device;
   request a first multilaterated position from a network provider system, the first multilaterated position being based at least in part on a round trip time of a radio communication between the first mobile computing device and a cellular network access point detectable by the first mobile computing device;
   receive the first multilaterated position from the network provider system;

obtain a second multilaterated position of a second mobile computing device from the network provider system;

determine that the first multilaterated position of the first mobile computing device is within a threshold distance of the second multilaterated position of the second mobile computing device; and generate a delivery confirmation in response to determining that the first multilaterated position is within the threshold distance of the second multilaterated position.

8. The system of claim 7, wherein the machine readable instructions that cause the computing device to obtain the second multilaterated position further cause the computing device to at least:

request the second multilaterated position from the network service provider, the second multilaterated position being based at least in part on a signal strength of a cellular network access point detectable by the second mobile computing device; and receive the second multilaterated position from the network service provider.

9. The system of claim 7, wherein the machine readable instructions that cause the computing device to obtain the second multilaterated position further cause the computing device to at least:

request the second multilaterated position from the network service provider, the second multilaterated position being based at least in part on a round trip time of a radio communication between the second mobile computing device and a cellular network access point visible to the second mobile computing device; and receive the second multilaterated position from the network service provider.

10. The system of claim 7, wherein the machine readable instructions that cause the computing device to obtain the second multilaterated position further cause the computing device to at least:

request the second multilaterated position from the network service provider, the second multilaterated position being based at least in part on a signal strength of a Wi-Fi access point detectable by the second mobile computing device; and receive the second multilaterated position from the network service provider.

11. The system of claim 7, wherein the machine readable instructions, when executed by the processor, further cause the computing device to send the delivery confirmation to the first mobile computing device.

12. The system of claim 7, wherein the machine readable instructions, when executed by the processor, further cause the computing device to send the delivery confirmation to the second mobile computing device.

13. A system, comprising:

a computing device comprising a processor and a memory; and machine readable instructions stored in the memory that, when executed by the processor, cause the computing device to at least:

receive a delivery notification from a first mobile computing device;

request a first multilaterated position from a first mobile computing device, the first multilaterated position being based at least in part on signal strength of a Wi-Fi access point visible to the first mobile computing device;

receive the first multilaterated position from the first mobile computing device;

obtain a second multilaterated position from a second mobile computing device;

determine that the first multilaterated position of the first mobile computing device is within a threshold distance of the second multilaterated position of the second mobile computing device; and generate a delivery confirmation in response to determining that the first multilaterated position is within the threshold distance of the second multilaterated position.

14. The system of claim 13, wherein the machine readable instructions that cause the computing device to obtain the second multilaterated position further cause the computing device to at least:

request the second multilaterated position from the second mobile computing device, the second multilaterated position being based at least in part on a signal strength of a cellular network access point detectable by the second mobile computing device; and receive the second multilaterated position from the second mobile computing device.

15. The system of claim 13, wherein the machine readable instructions that cause the computing device to obtain the second multilaterated position further cause the computing device to at least:

request the second multilaterated position from the second mobile computing device, the second multilaterated position being based at least in part on a round trip time of a radio communication between the second mobile computing device and a cellular network access point visible to the second mobile computing device; and receive the second multilaterated position from the second mobile computing device.

16. The system of claim 13, wherein the machine readable instructions that cause the computing device to obtain the second multilaterated position further cause the computing device to at least:

request the second multilaterated position from the second mobile computing device, the second multilaterated position being based at least in part on signal strength of a Wi-Fi access point visible to the second mobile computing device; and receive the second multilaterated position from the second mobile computing device.

17. The system of claim 13, wherein the machine readable instructions, when executed by the processor, further cause the computing device to send the delivery confirmation to the first mobile computing device.

18. The system of claim 13, wherein the machine readable instructions, when executed by the processor, further cause the computing device to send the delivery confirmation to the second mobile computing device.

* * * * *